United States Patent Office.

ALFRED STARR, OF NEW YORK, N. Y.

Letters Patent No. 75,312, dated March 10, 1868.

IMPROVED SOLDER FOR ALUMINUM.

*The Schedule referred to in these Letters Patent and making part of the same.*

TO ALL WHOM IT MAY CONCERN:

Be it known that I, ALFRED STARR, of the city and State of New York, have invented and made a Compound or Alloy for Soldering Aluminum; and I do hereby declare the following to be a correct description of the same.

Heretofore great difficulty has been experienced in the use of aluminum, and for many purposes in the arts it was almost entirely useless, for the lack of a reliable solder to attach pieces of said metal together.

For dental purposes, in particular, aluminum is especially adapted, in consequence of its lightness, and because the acids of the mouth have little or no effect upon the same; but little use has been made of it because there was no solder that would adhere thereto.

My invention removes the difficulties heretofore connected with the use of aluminum, particularly for plates for artificial teeth, as it enables me to solder several pieces of said metal together in a very firm and reliable manner; and my solder is but little affected by the acids of the mouth.

The alloy or compound which I employ as a solder for aluminum is composed of silver, lead, and tin, in about equal proportions, to which zinc is added to the extent of about half the weight of the silver. These metals are to be melted and thoroughly mixed together, and will be found to flow freely upon metallic plates or other articles of aluminum, and unite them firmly together.

This solder, although heavier than aluminum, resembles it very closely in color, and is not easily corroded, and is itself very strong.

What I claim, and desire to secure by Letters Patent, is—

The compound or alloy specified, as a solder for aluminum.

In witness whereof, I have hereunto set my signature, this first day of February, A. D. 1868.

ALFRED STARR.

Witnesses:
CHAS. H. SMITH,
GEO. D. WALKER.